US012801959B2

(12) United States Patent
Jin et al.

(10) Patent No.: US 12,801,959 B2
(45) Date of Patent: Nov. 17, 2026

(54) QUANTUM SIMULATION APPARATUS AND METHOD

(71) Applicant: Electronics and Telecommunications Research Institute, Daejeon (KR)

(72) Inventors: Ki Sung Jin, Daejeon (KR); Gyu Il Cha, Daejeon (KR); Chang Dae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1048 days.

(21) Appl. No.: 17/869,025

(22) Filed: Jul. 20, 2022

(65) Prior Publication Data

US 2023/0196157 A1 Jun. 22, 2023

(30) Foreign Application Priority Data

Dec. 20, 2021 (KR) ........................ 10-2021-0183004
Mar. 2, 2022 (KR) ........................ 10-2022-0026686

(51) Int. Cl.
*G06N 10/00* (2022.01)
*G06N 10/20* (2022.01)
*G06N 10/70* (2022.01)

(52) U.S. Cl.
CPC ............. *G06N 10/20* (2022.01); *G06N 10/00* (2019.01); *G06N 10/70* (2022.01)

(58) Field of Classification Search
None
See application file for complete search history.

(56) References Cited

U.S. PATENT DOCUMENTS

| | | | | |
|---|---|---|---|---|
| 9,092,959 | B2 | 7/2015 | Kim et al. | |
| 11,411,658 | B1 * | 8/2022 | Vacon | H04B 10/70 |
| 2017/0329635 | A1 * | 11/2017 | Rathke | G06F 30/20 |
| 2020/0099391 | A1 | 3/2020 | Quintin | |
| 2020/0218787 | A1 * | 7/2020 | Doi | G06N 10/20 |
| 2021/0049496 | A1 | 2/2021 | Kalendarov et al. | |
| 2021/0132969 | A1 | 5/2021 | Smith | |

(Continued)

FOREIGN PATENT DOCUMENTS

| | | | | |
|---|---|---|---|---|
| CN | 113222157 A * | 8/2021 | | G06N 10/00 |
| KR | 10-2001595 B1 | 10/2019 | | |

OTHER PUBLICATIONS

Andres-Martinez, "Towards Distributed Quantum Algorithms", University of Edinburgh, 2018, pp. 1-67.

(Continued)

*Primary Examiner* — Xuyang Xia
(74) *Attorney, Agent, or Firm* — KILE PARK REED & HOUTTEMAN PLLC

(57) ABSTRACT

A quantum simulation apparatus according to an embodiment of the present disclosure includes a quantum circuit distributor configured to receive and transfer a plurality of quantum circuits, and a multi-quantum register controller configured to control independent allocation and execution of the input quantum circuits into multi-quantum registers supporting a reduced quantum state space, wherein the multi-quantum register provides the reduced quantum state space with respect to a real quantum state having a physical reality with an amplitude value that is not 0 in a wide-area quantum state space.

15 Claims, 9 Drawing Sheets

(56) References Cited

U.S. PATENT DOCUMENTS

| | | | | |
|---|---|---|---|---|
| 2021/0142101 | A1 | 5/2021 | Jang et al. | |
| 2021/0256351 | A1 | 8/2021 | Cao et al. | |
| 2021/0271477 | A1* | 9/2021 | Jiang | G06N 10/60 |
| 2021/0374307 | A1* | 12/2021 | Haener | G06F 30/20 |
| 2021/0374593 | A1* | 12/2021 | Niroula | G06N 10/40 |
| 2021/0391873 | A1* | 12/2021 | Zheng | G06N 3/045 |
| 2021/0399743 | A1* | 12/2021 | Zheng | G06N 10/70 |

OTHER PUBLICATIONS

Qin et al., "Controllable single-photon transport between remote coupled-cavity arrays", Physical Review, A 93, 032337, Mar. 24, 2016, pp. 1-8.

* cited by examiner

QUANTUM SIMULATION APPARATUS AND METHOD

CROSS-REFERENCE TO RELATED APPLICATION

This application claims priority to and the benefit of Korean Patent Application No. 10-2021-0183004, filed on Dec. 20, 2021, and Korean Patent Application No. 10-2022-0026686, filed on Mar. 2, 2022, the disclosure of which is incorporated herein by reference in its entirety.

BACKGROUND

1. Technical Field

The present disclosure relates to a quantum simulation apparatus and method for quantum simulations, and particularly, to a quantum simulation apparatus and method for executing a quantum algorithm by using a classic computer.

2. Related Art

A quantum computer is a computer for quickly processing complicated problems by using a quantum mechanical phenomenon, such as entanglement and superposition. The quantum computer is considered as a next-generation computer that can replace a semiconductor computer. However, technology researches related to the quantum computer have not yet reached implementation of the quantum computer.

The quantum computer has been actively researched by various enterprises. The recent quantum computer is in the early stages of development at the level of supporting quantum bits (qubits) having about 50 information errors, and has not yet been commercialized.

Meanwhile, since implementation of the quantum computer is yet in the initial stage, many researches still depend on quantum simulations using the classic computing. However, in order to simulate a quantum state of 50 qubits with the classic computer, there are limits in that lots of memory resources and computational resources are required.

SUMMARY

In order to solve the above problem, the present disclosure provides a quantum simulation apparatus and method, which supports more qubits even with a small memory, and supports a faster quantum operation by configuring a reduced quantum state space composed of only quantum states having physical reality in a quantum register while executing a quantum algorithm by using a classic computer.

However, problems to be solved by the present disclosure are not limited to the above-described problems, and other problems may exist.

In a first aspect of the present disclosure to solve the above problem, a quantum simulation apparatus includes: a quantum circuit distributor configured to receive and transfer a plurality of quantum circuits; and a multi-quantum register controller configured to control independent allocation and execution of the input quantum circuits into multi-quantum registers supporting a reduced quantum state space. In this case, the multi-quantum register provides the reduced quantum state space with respect to a real quantum state having a physical reality with an amplitude value that is not 0 in a wide-area quantum state space.

In a second aspect of the present disclosure, a method performed by a quantum simulation apparatus includes: receiving an input of a plurality of quantum circuits; distributing the input quantum circuits in multi-quantum registers; configuring a reduced quantum state space with respect to the quantum circuits distributed in the multi-quantum register; and controlling an execution of the multi-quantum register in which the reduced quantum state space is configured. In this case, the configuring of the reduced quantum state space with respect to the quantum circuits input into the multi-quantum register includes configuring the reduced quantum state space with respect to a real quantum state having a physical reality with an amplitude value that is not 0 in a wide-area quantum state space.

In another aspect of the present disclosure to solve the above problem, a computer program executes a quantum simulation method in combination with a hardware computer, and is stored in a computer-readable recording medium.

Other detailed matters of the present disclosure are included in the detailed description and drawings.

According to an embodiment of the present disclosure described above, since only the quantum states having the physical reality quantum effects are selected and managed in the reduced quantum state space, it is possible to support more qubit simulations on the smaller memory resource, and it is possible to secure the rapid quantum simulations through the quantum operation application method optimized for the reduced quantum state space.

Further, since simultaneous execution of various quantum circuits is provided by independently maintaining a plurality of quantum registers in one quantum simulations, it is possible to support a more flexible quantum circuit application method.

Respective embodiments of the present disclosure may be combined with the existing classic quantum simulation apparatus through individual element technology, and in case of integrally configuring them, it is possible to embody the same in the shape of a completed quantum simulation.

Effects of the present disclosure are not limited to those described above, and other unmentioned effects will be able to be clearly understood by those of ordinary skill in the art from the following description.

DETAILED DESCRIPTION

Figure 1:
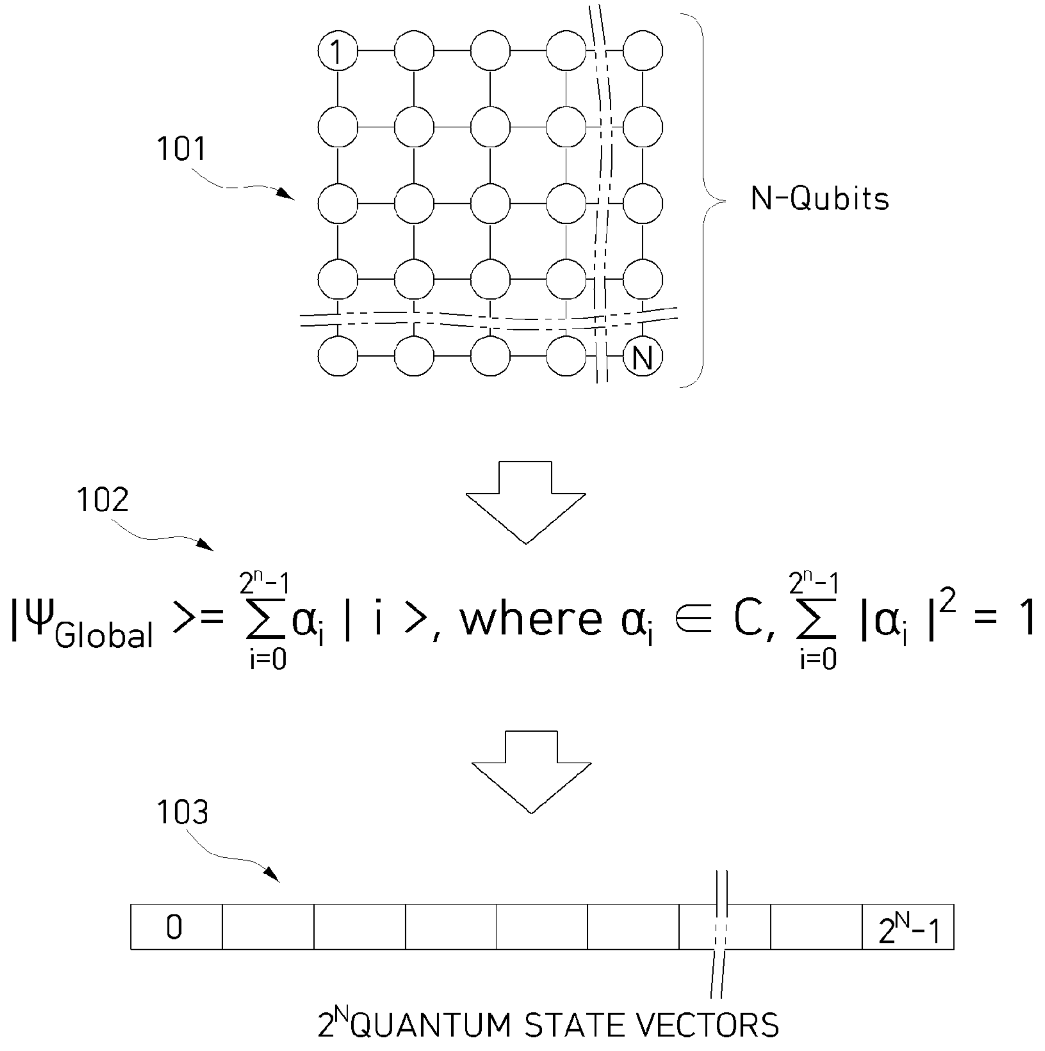
FIG. 1 illustrates an example of expressing a quantum state in classic quantum computing in a memory space of a computer.

The aspects and features of the present disclosure and methods for achieving the aspects and features will be apparent by referring to the embodiments to be described in detail with reference to the accompanying drawings. However, the present disclosure is not limited to the embodiments disclosed hereinafter, and it can be implemented in various different forms. However, the embodiments are provided to complete the present disclosure and to assist those of ordinary skill in the art in a comprehensive understanding of the scope of the technical idea, and the disclosure is only defined by the scope of the appended claims.

Terms used in the description are to explain the embodiments, but are not intended to limit the present disclosure. In the description, unless specially described on the contrary, the constituent element(s) may be singular or plural. In the description, the term "comprises" and/or "comprising" should be interpreted as not excluding the presence or addition of one or more other constituent elements in addition to the mentioned constituent elements. Throughout the whole description, the same reference numerals are used to indicate the same constituent elements, and the term "and/or" includes each of the mentioned constituent elements and all combinations of one or more thereof. The terms "first", "second", and so forth are used to describe various constituent elements, but these constituent elements should not be limited by the terms. The above-described terms are used only for the purpose of discriminating one constituent element from another constituent element. Accordingly, the first constituent element to be mentioned hereinafter may be the second constituent element in the technical idea of the present disclosure.

Unless otherwise defined, all terms (including technical and scientific terms) used in the description may be used as the meaning that can be commonly understood by those skilled in the art to which the present disclosure pertains. Further, unless clearly and specially defined, the terms defined in generally used dictionaries should not be interpreted ideally or excessively.

Hereinafter, to help understanding of those skilled in the art, backgrounds in which the present disclosure is proposed will be first described, and then, embodiments of the present disclosure will be described.

A quantum computer is a futuristic super computer based on quantum mechanics, such as entanglement and superposition. With the prospect that a quantum computer will be commercialized within 10 years, the quantum computer has been spotlighted as a future technology to solve problems that mankind has not yet solved, such as new materials, new drug development, aerospace, and the like.

Such a quantum computer has been researched by various enterprises. IBM was the first company that introduced quantum computing to a public cloud so that a user was able to remotely access the quantum computer, and in 2018, Google proclaimed to the scientific community that they had achieved quantum supremacy by using 54-qubit quantum processor called Sycamore. However, since implementation of a practical quantum computer is still in its infancy, many researches in this field still depend on quantum simulations using the classic computing.

Over the past 10 years, various types of classic quantum simulators have already been researched. Depending on their purposes pursued, they have different operation types, functions, performances, and restrictions. Such various quantum simulators have shown good results in various fields. Nevertheless, the existing quantum simulators have clear limits in the number of available qubits. The reason is because as the number of qubits is increased in the quantum simulator, the physical memory space is exponentially increased.

For example, the minimum memory requirements for simulating the quantum state of 50 qubits with the classic computer reach 16 PB. In order to copy 72-qubit bristlecone that is the latest quantum processor of Google onto the classic quantum simulator, a 64 ZB memory is necessary, and this corresponds to an impossible area through the classic computing. To the current level of technology, it is known that simulation of about 30-qubit circuit, 35-qubit circuit, and 49-qubit circuit can be conducted in a laptop computer, high-end computer, and super computer, respectively.

However, in order to simulate a quantum state of 50 qubits with the classic computer, there are limits in that lots of memory resources and computational resources are required.

FIG. 1 illustrates an example of expressing a quantum state in classic quantum computing in a memory space of a computer.

In FIG. 1, "101" represents an individual qubit of the classic quantum computing. Although a 2D grid form is shown in FIG. 1 in order to express N qubits, this is merely an example, and configuration of real quantum qubits may be provided in various forms.

In FIG. 1, "102" expresses the total quantum states that can be represented by N qubits in the form of a mathematical expression. In accordance with quantum superposition and entanglement, the states of individual qubits may be exponentially expanded, and the corresponding total quantum number is $2^N$. Each of the individual quantum states has a complex value $\alpha_i$ that is independently called an amplitude.

In depicting such a quantum state in a memory of the computer, a state vector array, such as 103 is used. That is, in order to express the entire quantum states, $2^N$ array entry is necessary. In order to secure precision of the quantum state, since each complex number is expressed by double precision (16 bytes), the required memory space for depicting the entire quantum states is $2^{N+4}$ bytes.

The problem is that as the number of qubits is increased, the memory requirements are exponentially increased. For example, the memory amount (e.g., 512 GB) required to simulate 35 qubits is increased double (e.g., 1 TB) even in case that the simulation size is increased by 1 qubit only. Such an explosive increase of the memory requirements becomes a problem that is difficult to be physically solved in the classic computer.

Figure 2:
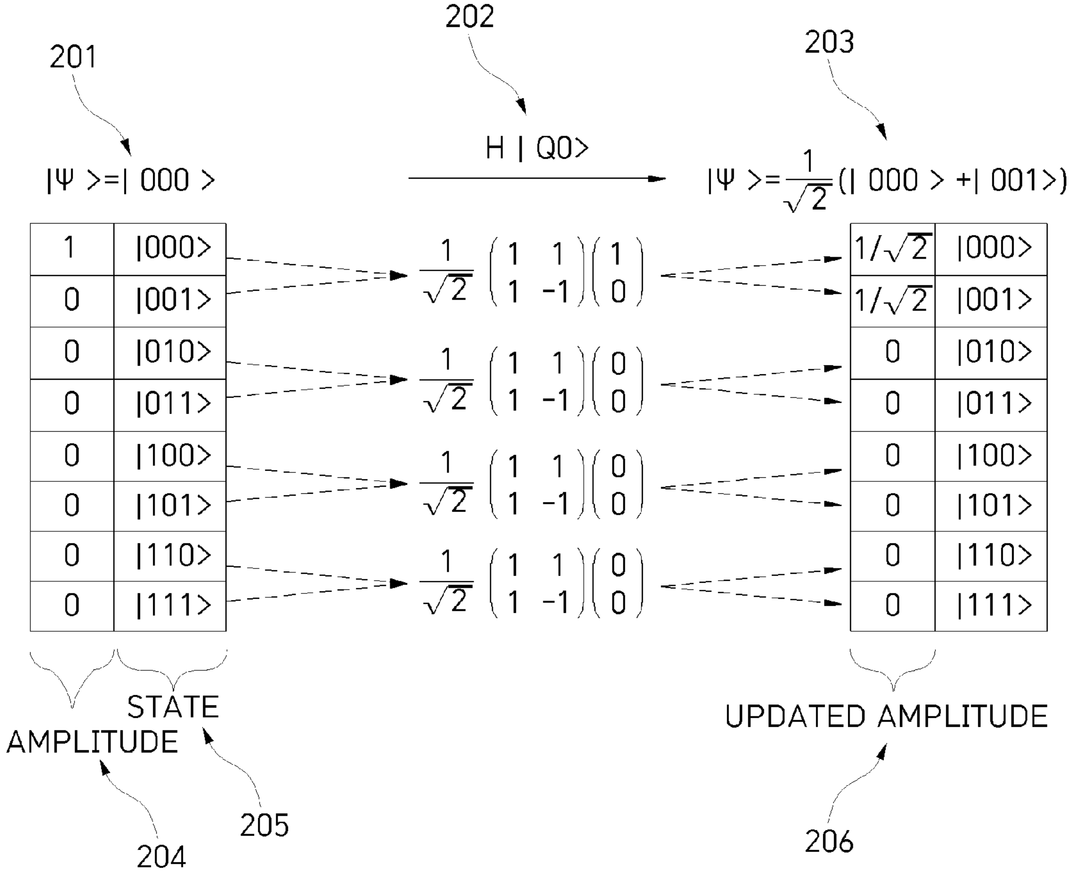
FIG. 2 is a diagram explaining the contents of executing a quantum operation in classic computing.

FIG. 2 is a diagram explaining the contents of executing a quantum operation in classic computing. In FIG. 2, for example, it is assumed that all qubits have been initialized in the |0> state in a quantum simulator composed of three qubits.

"201" represents a wide-area quantum state before a quantum operation 202 is executed. Since the number of qubits is 3, the number of the entire wide-area quantum states is 8 in accordance with the $2^N$ rule, and is expressed as 8 state vector arrays as "201". In the state vector array 201, "204" represents a probability amplitude, and "205" represents a quantum state. In this case, since all qubits have been initialized as |0>, only the amplitude in the |000> state has the value of "1", and the amplitude of 7 remaining quantum states has the value of "0".

If a superposition operation for the first qubit is performed in the wide-area quantum state 201, a 2×2 matrix operation is performed with respect to state pairs exerted by the operation as shown as 202. That is, since the number of the entire quantum states is 8, $2^{N-1}$ times (4 times) 2×2 matrix operation is executed, and the result thereof is stored as shown as 203. In this case, "206" means a probability amplitude value updated in accordance with the result of the quantum operation. Here, it is to be noted that in case that the probability amplitudes of the quantum pairs are all "0", the operation results are always "0", and it is not necessary to calculate them, and the quantum pairs exert no influence on the quantum phenomena.

From the above fact, important implications may be inferred. If it is possible to selectively manage only the quantum states having the physical reality when the quantum state is depicted in a classic computing space, first, the memory space for expressing the quantum states can be dramatically reduced, and second, unnecessary quantum operations can be avoided, and thus faster execution of the quantum algorithms can be secured.

As described above through FIGS. 1 and 2, two problems fundamentally inherent in the classic quantum simulator may be summarized as follows.

First, the memory space for expressing the quantum state with the classic computer is $2^{N+4}$ bytes, and with the increase of the number of cubits, the size of the necessary physical memory is exponentially increased. Since it is not possible to physically increase the memory indefinitely, the number of cubits that can be provided by the classic computer at the current technology level is limited to about 50.

Second, since the classic quantum simulators in the related art do not consider the amplitude of the quantum states when applying the quantum operation to the cubits, $2^{N-1}$ times calculation is always necessary for every quantum operation. In particular, the exponential characteristics of the number of quantum calculations cause the quantum simulation time to be exponentially increased with the increase of the qubits.

In order to solve the problem, the quantum simulation apparatus and method according to an embodiment of the present disclosure supports more qubits even with a small memory, and provides a faster quantum operation by configuring a reduced quantum state space composed of only quantum states having physical reality in a quantum register while executing a quantum algorithm by using a classic computer.

In order to achieve the above object, an embodiment of the present disclosure provides a structure of a quantum simulator based on a reduced quantum state space, a method and a procedure for managing the reduced quantum state space, a method for high-speed quantum operation execution in the reduced quantum state space, a method for configuring multi-quantum registers, and a method for executing in parallel a plurality of quantum algorithms in independent quantum spaces. Through this, a quantum simulation using the classic computer is provided, and the problem in that the memory space and the operation time is exponentially increased can be solved.

Hereinafter, a quantum simulation apparatus 300 according to an embodiment of the present disclosure will be described with reference to FIGS. 3 to 9.

Figure 3:
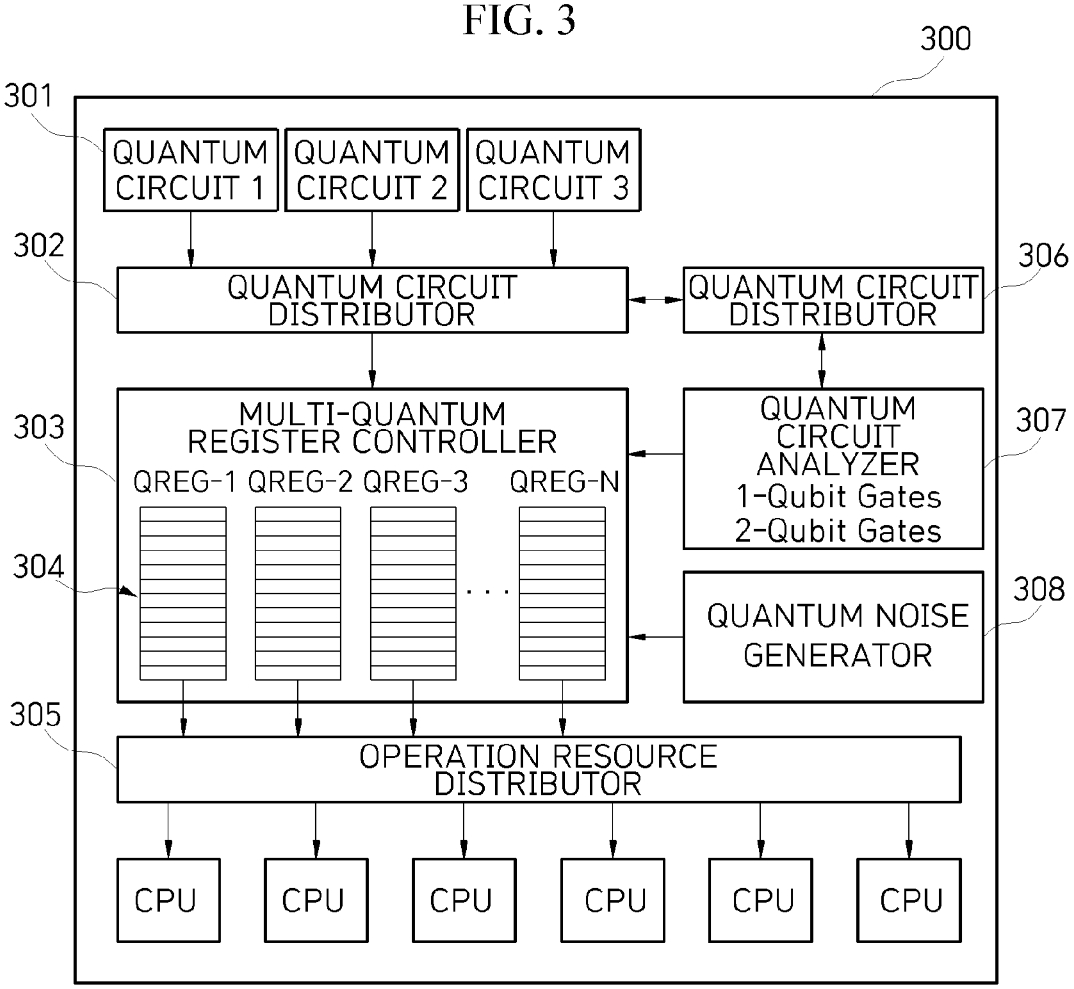
FIG. 3 is a block diagram of a quantum simulation apparatus according to an embodiment of the present disclosure.

FIG. 3 is a block diagram of a quantum simulation apparatus 300 according to an embodiment of the present disclosure.

Meanwhile, the quantum simulation apparatus 300 illustrated in FIG. 3 is not referred to as a real physical quantum computer, but means a classic type quantum simulator using a computer. Hereinafter, the simulation apparatus 300 according to the present disclosure is not limited to being performed in a specific hardware environment. It may be configured using a general purpose computer system or a storage device. That is, the quantum simulation apparatus 300 according to the present disclosure may be configured to include a communication module, a memory, and a processor.

Referring to FIG. 3, the quantum simulation apparatus 300 according to an embodiment of the present disclosure includes a quantum circuit distributor 302, a multi-quantum register controller 303, an operation support distributor 305, a quantum circuit analyzer 306, a quantum operator 307, and a quantum noise generator 308.

First, the quantum circuit distributor 302 receives an input of a plurality of quantum circuits 301, and transfers the input quantum circuits 301 to a multi-register controller 304. That is, the quantum circuit distributor 302 transfers the quantum circuit 301 input by a user to the multi-quantum register controller 304, and requests the multi-quantum register controller 304 to execute the quantum circuit 301. As an embodiment, the quantum circuit distributor 302 does not simply transfer only the quantum circuit 301, but if an execution complexity of each quantum circuit 301 is calculated through the quantum circuit analyzer 306 to be described later, it transfers the execution complexity and the quantum circuit 301 at the same time.

Meanwhile, the quantum circuit 301 according to an embodiment of the present disclosure is used as an input of the quantum simulation apparatus 300, and the type or the characteristic thereof is not specially limited. That is, commonly used quantum circuits 301 may be used as the input of the quantum simulation apparatus 300.

As described above, the quantum circuit analyzer 306 predicts the execution complexity for the input quantum circuit 301, and the quantum circuit distributor 302 transfers the quantum circuit 301 and the predicted execution complexity of the quantum circuit 301 to the multi-quantum register controller 303.

The quantum circuit 301 may have various complexities in accordance with an algorithm designed by a user, and may directly exert an influence on the execution speed of the quantum simulation apparatus 300. Accordingly, the quantum circuit analyzer 306 may predict the execution complexity by applying specific weight values to the number of qubits of the quantum circuit 301, the number of gate operations applied to the quantum circuit 301, and depth information of the quantum circuit 301.

$$CircuitComplexity = NQ*W1 + NG*W2 + CD*W3 \quad \text{[Equation 1]}$$

$$\text{Where, } \left\{ \begin{matrix} NQ = \text{number of qubit} \\ NG = \text{number of gate} \\ CD = \text{circuit depth} \end{matrix} \right\}$$

Equation 1 is an algorithm for predicting the execution complexity for a certain quantum circuit 301 when the quantum circuit 301 is given. In Equation 1, NQ means the number of qubits used in the quantum circuit 301, NG means the total number of gates applied to the quantum circuit 301, and CD means depth information of the quantum circuit 301. Further, W1, W2, and W3 are weight values applied to respective conditions, and the sum of three weight values is set to become 1.

As an example, in case of simply considering only an execution time of the quantum circuit 301, it is advantageous in reduction of the simulation time to give high weight values W2 and W3 to the total number NG of gates of the quantum circuit or the depth information CD of the quantum circuit 301. As another example, in terms of optimization of computing calculation resources in accordance with the quantum operation parallelism, it may help the performance improvement to give a high weight value W1 to the number NQ of qubits of the quantum circuit.

However, in an embodiment of the present disclosure, the main purpose is to present an idea for predicting the execution complexity through the above three kinds of conditions, and an algorithm and a detailed method for determining the weight values are not specified in detail. This is because it is necessary to differently give the conditions of the weight values depending on the intentions of a system designer, and a detailed application method may differ in an actual implementation stage of the present disclosure.

Next, the multi-quantum register controller 303 independently allocate and execute the input quantum circuit 301 to the multi-quantum registers 304 that support the reduced quantum state space. In this case, the multi-quantum registers 304 manage the reduced quantum state space composed of independent qubits as the quantum circuits 301 are allocated, and information is not exchanged between the quantum registers 304. The reduced quantum state space configured in the multi-quantum register 304 will be hereinafter described in detail with reference to FIG. 5.

When the quantum registers 304 execute the quantum circuits 301, the operation resource distributor 305 allocates computing resources (e.g., plural CPUs) to the quantum registers 304. In this case, the operation resource distributor 305 distributes the computing resources for the multi-quantum registers 304 based on the execution complexity predicted by Equation 1, and thus the distribution of resources of the quantum registers 304 may differ.

$$\#\text{Cores} = TotalCores \times \frac{Complexity_i}{SumOfComplexity} \qquad \text{[Equation 2]}$$

Equation 2 is an algorithm for allocating different calculation resources to the quantum registers 304 depending on the predicted execution complexity when the input plurality of quantum circuits 301 are executed in parallel. In this case, in Equation 2, TotalCores means the total sum of the entire computing resources mounted on the system.

That is, the operation resource distributor 305 may distribute the computing resources to the corresponding quantum registers 304 in accordance with a ratio of the execution complexity of the individual quantum circuit to the total execution complexity of the plurality of quantum circuits 301 with respect to the entire computing resources. In an embodiment of the present disclosure, the reason why the computing operation resources are differentially allocated to the quantum circuits 301 is to solve the execution imbalance according to the complexity of the quantum circuits 301 and to use the limited computing resources as efficiently as possible.

Meanwhile, Equation 2 relates to resource distribution for a case where plural quantum circuits 301 are simultaneously input, and according to embodiments, there may be a case where the quantum circuits 301 are separately input at time intervals. For example, it is assumed that quantum circuit 2 is given as an input when quantum circuit 1 is solely input, and then occupies all calculation resources to execute a simulation. In this situation, two kinds of control possibilities exist.

First is to execute quantum circuit 2 after the simulation execution of quantum circuit 1 is completed. This method is a very intuitive approach method, but has a problem in that execution of other quantum circuits may grow indefinitely due to quantum circuit 1. If it is assumed that quantum circuit 1 has a very high complexity and thus it takes quite a lot of execution time to an unpredictable extent, all remaining quantum circuits are unable to be executed during the time.

Second is to simultaneously execute quantum circuit 2 while quantum circuit 1 is under execution. By doing so, it is possible to execute another quantum circuit while the quantum circuit having a very long execution time occupies the calculation resources. However, in this case, since all calculation resources have been allocated to quantum circuit 1, it is required to newly define the resource distribution rule in overall consideration of quantum circuit 1 and quantum circuit 2. For this, in an embodiment of the present disclosure, it is possible to simultaneously execute the two quantum circuits by redistributing the resources in accordance with the execution complexity calculated through Equation 1 and the resource distribution rule of Equation 2.

Figure 4:
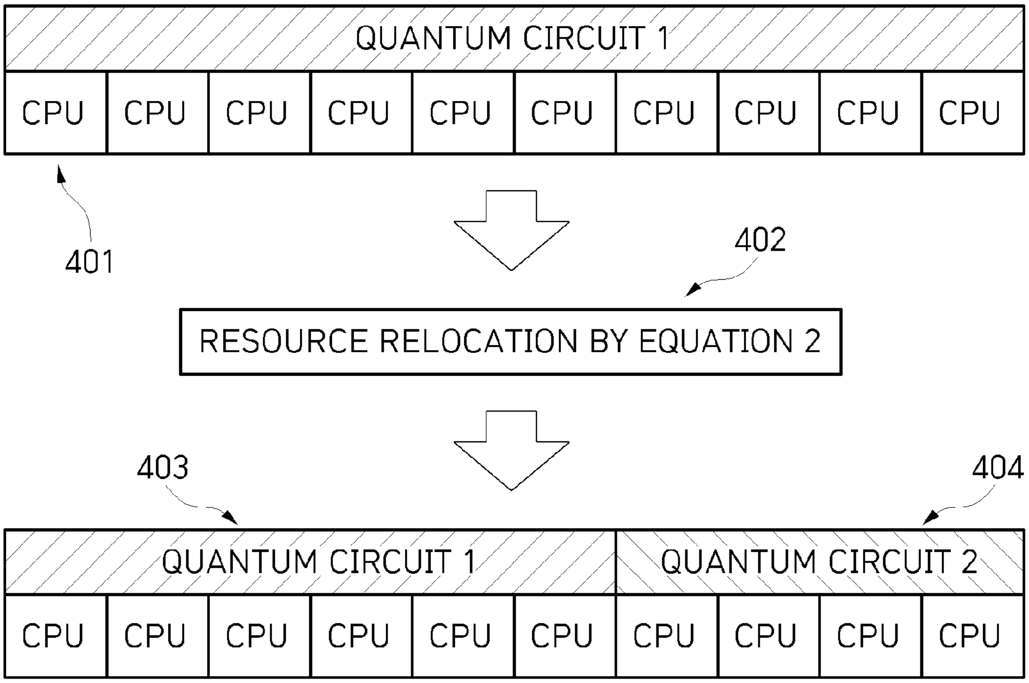
FIG. 4 is a diagram illustrating an example of resource redistribution that secures simultaneous execution of a plurality of quantum registers.

FIG. 4 is a diagram illustrating an example of resource redistribution that secures simultaneous execution of a plurality of quantum registers 304. In FIG. 4, 401 means a case where quantum circuit 1 is singly executed, and if quantum circuit 2 is given as a new input, the operation resource distributor 305 may redistribute the resources like 403 and 404 depending on the execution complexity, and thus simultaneous execution of the quantum circuits 1 and 2 can be secured.

Figure 5:
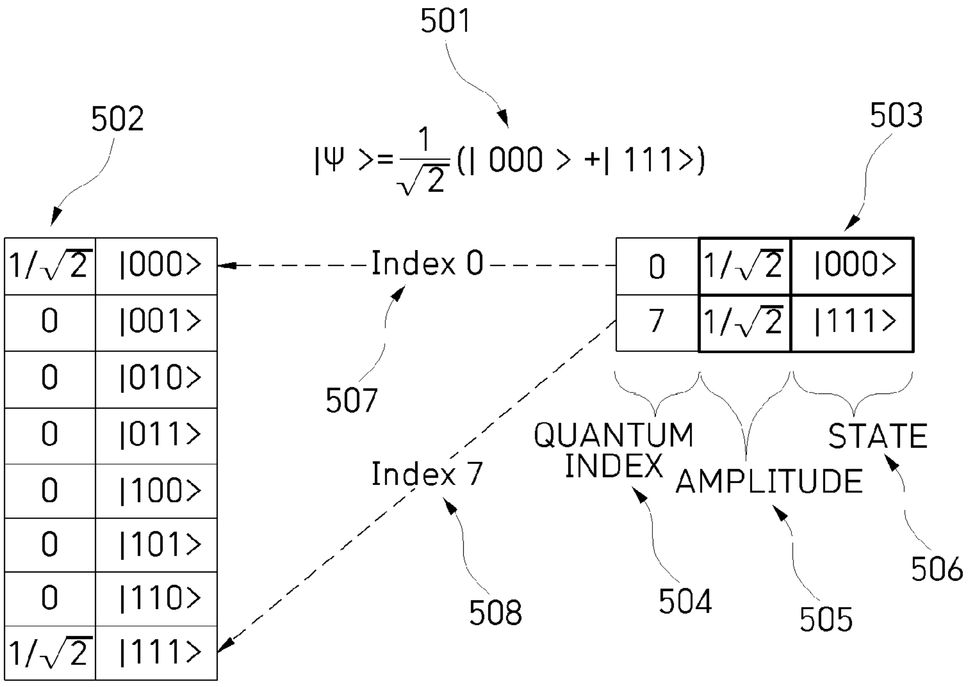
FIG. 5 is a diagram explaining a reduced quantum state space in a quantum register.

FIG. 5 is a diagram explaining a reduced quantum state space in a quantum register.

Meanwhile, an embodiment of the present disclosure is featured so that the multi-quantum registers 304 configure and manage a reduced quantum state space. That is, the multi-quantum register 304 provides the reduced quantum state space with respect to a real quantum state having a physical reality with an amplitude value that is not 0 in a wide-area quantum state space.

Meanwhile, it is to be noted that the reduced quantum state space of the multi-quantum register 304 does not approximate or distort the wide-area quantum state. That is, the reduced quantum state space proposed in an embodiment of the present disclosure has a reduced quantum number in comparison to the existing quantum state expression method, but always secures identity with the wide-area quantum state.

In an example of FIG. 5, it is assumed that three qubits exist, and have been prepared in Greenberger-Horne-Zeilinger (GHZ) state through previous quantum operation. In this case, the GHZ state means that all qubits form an entanglement relationship.

In FIG. 5, 502 represents a method for expressing a wide-area quantum state in the existing quantum state vector expression method. In this case, since the number of qubits is 3, 8 quantum state vector arrays exist in accordance with the $2^N$ rule. In the quantum states, individual amplitude values are given, and in the GHZ state, only the amplitude values of |000> state and |111> state exist as $1/\sqrt{2}$, and the 6 remaining amplitudes are "0". As described above, in the existing state vector expression method, $2^N$ quantum state vector arrays are always necessary regardless of existence/nonexistence of the amplitude values.

In contrast, 503 of FIG. 5 represents a quantum state expression method according to the reduced quantum state space. In case of the reduced quantum state space, only two quantum state vector entries whose amplitude is not 0 are managed instead of $2^N$ quantum state vector arrays. In this case, 505 means the probability amplitude of the corresponding quantum state, and 506 means individual quantum states.

Meanwhile, in order to secure complete quantum states even in the reduced quantum state space, $2^N$-sized wide-area quantum state space should be expressed, and thus in an embodiment of the present disclosure, separate quantum indexes 504 are maintained for this.

That is, in an embodiment of the present disclosure, the multi-quantum registers 304 may configure the reduced quantum state space by allocating quantum indexes that are ascending values of the quantum state4s in a logical $2^N$ space, which represent positions in the $2^N$ wide-area quantum state space composed of N qubits, to the real quantum states constituting the reduced quantum state space. Accordingly, the |000> state corresponds to 0 as the quantum index value, and the |111> state corresponds to $7(2^3-1)$ as the quantum index value.

An embodiment of the present disclosure can not only manage the reduced quantum state space including only the quantum states having the physical reality through the quantum indexes, but also accurately depict the complete wide-area quantum states through the quantum indexes.

Figure 6:
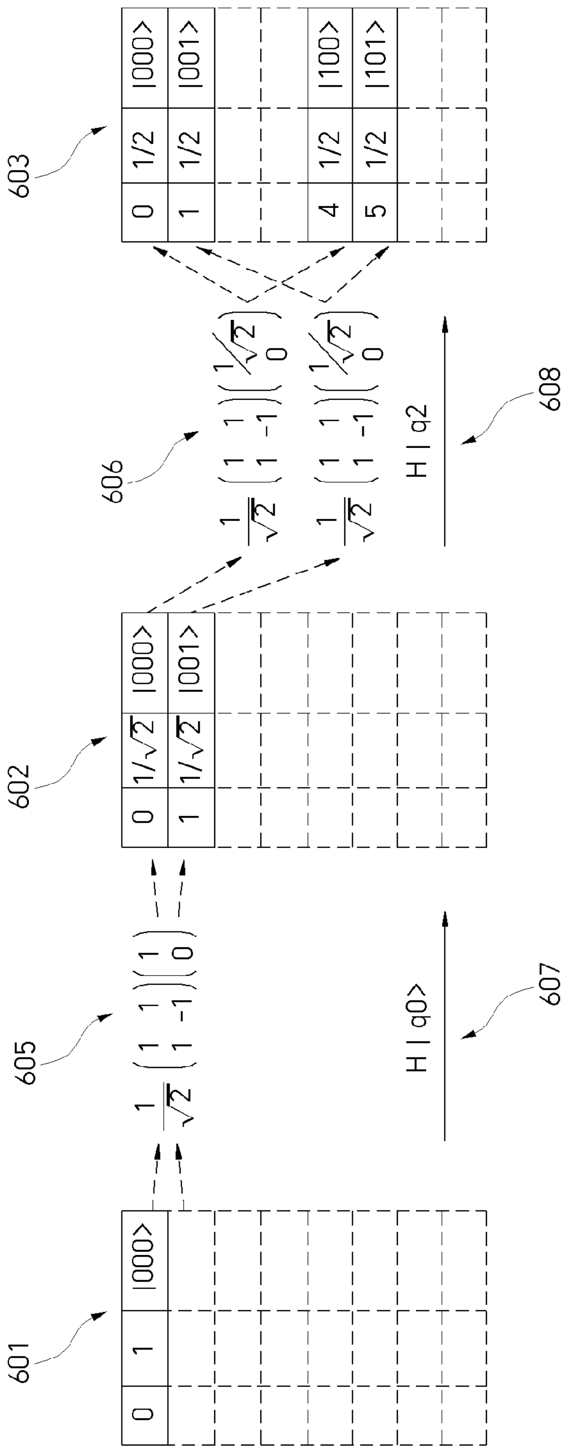
FIG. 6 is a diagram explaining a quantum operation processing method in a reduced quantum state space.

FIG. 6 is a diagram explaining a quantum operation processing method in a reduced quantum state space.

FIG. 6 illustrates an example of processing individual quantum operations in the reduced quantum state space described in FIG. 5. The existing state vector expression method has the problem in that matrix calculation as many as $2^{N-1}$ times is always necessary regardless of existence/nonexistence of amplitude values. However, an embodiment of the present disclosure has an advantage in that the number of times of entire matrix calculations can be dramatically reduced through selective quantum operations in consideration of the amplitude values.

That is, in case of applying the matrix operation according to performing of the quantum gate operation in the reduced quantum state space, the multi-quantum register controller 303 can apply the matrix operation only in case that at least one amplitude of the quantum state vectors constituting the quantum state pair is not 0.

Referring to FIG. 6, for example, it is assumed that all qubits are initialized as |0> in three qubit environments. In this case, the wide-area quantum state is the |000> state like 601, and the amplitude value is "1". Thereafter, if a Hadamard gate for quantum superposition is applied to q0 like 607, the quantum state evolves like 602.

In this case, it is to be noted that in case of applying the quantum operation to 601 quantum state, the matrix operation is applied only in case that even any one of two amplitude values of the quantum state pair is not 0 instead of applying the 2×2 matrix operation corresponding to the Hadamard gate with respect to all quantum state pairs. The reason is because the matrix operation result always converges to "0" with respect to the quantum state pair whose amplitude values are all "0", and thus the calculation itself becomes unnecessary. Further, since whether to perform the matrix operation is determined only with respect to the reduced quantum states, it is unnecessary to test the amplification values with respect to $2^N$ entire quantum states. Accordingly, in the example of FIG. 6, the quantum state of 602 can be obtained through only once matrix operation.

More specifically, a case (608) where the Hadamard gate for the quantum superposition is reapplied to the quantum state q2 of 602 will be described as an example. In case of applying the gate operation to q2, the quantum state pairs are expressed as quantum index sets {0, 4}, {1, 5}, {2, 6}, and {3, 7} in accordance with the quantum state processing rule.

According to the method for managing the reduced quantum state space according to an embodiment of the present disclosure, only two quantum states |000> and |001> exist in 602, and the Hadamard gate is selectively applied only with respect to the two quantum states.

First, the conjugate index of the quantum state pair corresponding to the operation in the |000> state is "4", and the amplitude is "0". The matrix operation is applied for two amplitudes $\{1/\sqrt{2}, 0\}$ of the corresponding quantum state pair, and the result of the operation is reflected as the result amplitude value in positions of quantum indexes "0" and "4" of 603.

Also, the matrix operation is applied for the amplitudes $\{1/\sqrt{2}, 0\}$ of the indexes {1, 5} of the quantum state pair corresponding to the operation in the second 1001> state, and the result is reflected in the positions of the quantum indexes {1, 5} of 603. In this case, 602 and 603 of the above example are not separately existing quantum spaces. This is exemplary, and in reality, the probability amplitude is updated in-place in one quantum state space.

Figure 7:
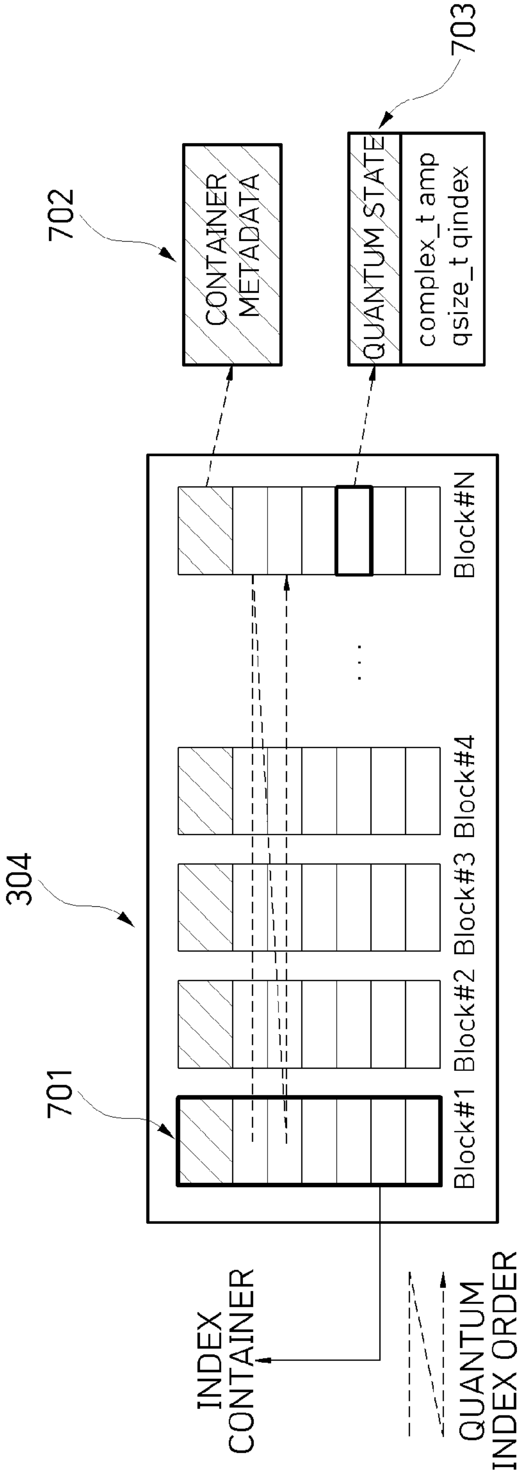
FIG. 7 is a diagram explaining an internal structure of an individual quantum register.

FIG. 7 is a diagram explaining an internal structure of an individual quantum register 304.

In an embodiment of the present disclosure, the quantum registers 304 manage independent quantum states in accordance with the reduced quantum state space management method, and information is not exchanged between the quantum registers 304.

Each of the quantum registers 304 includes a plurality of index containers 701 for supporting parallel processing of quantum state tracking and quantum operations. In this case, on the index containers 701, real quantum states may be stored in the order of quantum indexes.

In FIG. 7, dotted lines indicate the order in which the real quantum states are stored in the quantum register 304, and the real quantum states are stored in the order of quantum indexes. In this case, according to an embodiment of the present disclosure, if a certain quantum state is given, an index container 701 to store the given quantum state based on "the quantum state index value % the number of index containers" is determined, and in the index container 701*s*, all quantum states are stored in the ascending order of indexes.

As an embodiment, each of the plurality of index containers 701 includes a metadata area 702 and a data area 703. The metadata area 702 manages the number of quantum states included in the index container 701 and lock information that supports parallel processing of the quantum operations. The data area 703 stores attribute information including quantum indexes and amplitude values of the real quantum states. For example, if it is assumed that the quantum state is $\alpha$51 00010>, the amplitude value "$\alpha$" and the quantum state index value "2" (bit 10) are stored in the corresponding data area.

Referring again to FIG. 3, the quantum simulation apparatus 300 according to an embodiment of the present disclosure may include a quantum operator 307 that provides the gate operation rule used in the quantum computer.

The gates provided by the quantum operator 307 may be used in case that the quantum circuit analyzer 306 calculates the execution complexity of the quantum circuit, or the quantum register 304 applies the quantum operation of the qubits. In this case, the quantum operator 307 may provide, to the quantum register 304, at least one rule of the 1-qubit gate operation rule and the 2-qubit gate operation rule, and for example, 1-qubit gates, such as x, Z, and H, and 2-qubit gate, such as CNOT, correspond to this.

As an embodiment, in case that the quantum operator 307 applies the 1-qubit gate operation rule, the multi-quantum register controller 303 may calculate the amplitude value of the quantum state pairs corresponding to the quantum state given to the multi-quantum registers 304, calculate a new amplitude value by applying the matrix operation for the amplitude value of the quantum state pair, and then update the quantum registers 304 with the amplitude value calculated in the matrix operation. The 1-qubit gate operation rule will be described in detail.

Algorithm 1
ALGORITHM 1 one-qubit gate operation

```
Function     ApplyOneQubitGate
Input        Qubit : the number of target qubit
             M : 2x2 matrix of { m00, m01, m10, m11}
 1       deflower <- low order RS(Realized-State) in the
         2x2 matrix pair
 2       defupper <- high order RS in the 2x2 matrix pair
 3       for each RS in quantum register
 4         | if already applied states pair
 5         |   | Continue
 6         | end if
 7         | set amplitudes of lower and upper
 8         |   | if state index exists
 9         |   |   | set ampL(U) <- lower(upper) ->
           |   |   | amplitude( )
10         |   | else
11         |   |   | set ampL(U) <- zero
12         |   | end if
13         | perform matrix calculation
14         |   | newAmpL = m00*ampL+m01*ampU
15         |   | newAmpU = m10*ampL+m11*ampU
16         | apply new amplitudes of lower and upper
17         |   | if new AmpL(newAmpU) is zero
18         |   |   | remove old states or just skip if not exist
19         |   | else newAmpL(newAmpU) is greater then zero
20         |   |   | update old states or add new realized-states
21         |   | end of
22       end for
```

Next algorithm 1 shows an algorithm for processing 1-qubit gate operation in the quantum register 304. Representative example of the 1-qubit gate operation may be PauliX, PauliY, PauliZ, and Hadamard.

In algorithm 1, a 2×2 matrix for qubits to which the 1-qubit gate operation is to be applied and gate operations is input. In this case, values of the 2×2 matrix may differ depending on the kind of the input target gate operation. For explanation of the algorithm, it is defined that with respect to the quantum state pair that is the matrix operation target, the quantum state having a low quantum index order is lower, and the quantum state having a high quantum index order is upper.

The algorithm for applying the 1-qubit gate operation rule is repeatedly performed with respect to all quantum states being managed in the reduced quantum state space method in the quantum register 304 like line 3. That is, the loop is performed with respect to the quantum state corresponding to the index while traversing the quantum index values in the ascending order.

Line 4 checks whether the matrix operation has already been executed for the quantum state pair corresponding to the given quantum state. This scenario corresponds to a case where the lower or upper state already exists in the quantum register 304 before the gate operation is applied. If the matrix operation has already started, the line is branched to the start of the loop (line 3) instead of reapplying the matrix operation.

Lines 7 to 12 correspond to a step of obtaining the amplitude of the quantum pairs in order to apply the matrix operation. If the lower or upper state already exists in the quantum register 304, that is, if the amplitude is not "0", the amplitude stored in the quantum register 304 is used as it is. Unlike this, if the quantum state corresponding to the quantum state pair does not exist in the quantum register 304, the amplitude value is initialized to "0", and is used as the amplitude value of the quantum state pairs.

Lines 13 to 15 correspond to a step of applying the 2×2 matrix operation with respect to the two amplitudes of the quantum state pair. Since the two amplitude pairs {AmpL, AmpU} are the same as the 2×1 matrix, and are applied to the 2×2 matrix, the operation method of the matrix is the same as that of lines 14 to 15.

Last, lines 16 to 21 correspond to a step of reflecting the amplitude value newly calculated by the matrix operation in the quantum registers 304. For example, a situation in which ampL corresponding to the amplitude value of the lower state is reflected will be described. IN this case two kinds of scenarios may exist.

First is a situation in which the amplitude value of the ampL is "0". If the amplitude value to be updated is 0, the multi-quantum register controller 303 may remove the quantum state from the quantum register 304 in case that the quantum state corresponding to the quantum state pair exists in the quantum register 304. Unlike this, if the quantum state corresponding to the quantum state pair does not exist in the quantum register 304, the multi-quantum register controller 303 performs a next step without any reflection in the quantum register 304.

Second, in case that the amplitude value to be updated is not 0, the multi-quantum register controller 303 may update the amplitude value of the quantum state with the amplitude value to be updated if the quantum state corresponding to the quantum state pair exists in the quantum register 304, and allocate a new quantum state as a data storage item and add the new quantum state to the quantum register 304 if the quantum state corresponding to the quantum state pair does not exist.

That is, for example, a case where the amplitude value of the ampL is larger than 0 corresponds to a case where the ampL has the amplitude that is not actually 0. In this case, if the existing lower state already exists in the quantum register 304, the existing amplitude value is updated to a new amplitude value, whereas if the existing lower state does not exist in the quantum register 304, a data storage item for the new real quantum state is added to the quantum register 304. Meanwhile, the above process is equally applied even to the upper state.

Next, the 2-qubit gate operation rule will be described in detail. As an embodiment, if the 2-qubit gate operation rule is applied to the quantum operator, the multi-quantum register controller 303 sequentially traverses the real quantum states stored in the quantum register 304, and selects only a case where the quantum state of a control qubit is a |1> state as an objective matrix operation application target, and applies an objective matrix operation to the quantum state pairs corresponding to the objective qubit.

Algorithm 2
ALGORITHM 2 two-qubit controlled gate operation

```
Function     ApplyTwoQubitGate
Input        Control : the number of control qubit
             Target : the number of targer qubit
```

-continued

Algorithm 2
ALGORITHM 2 two-qubit controlled gate operation

```
  CM : 2×2 matrix of { m00, m01, m10, m11}
1 for each realized-state(RS) in quantum register
2 |  if state bit of control qubit is |0>
3 |  |  coutinue
4 |  else
5 |  |  applyCM to Target as like 4~21 of ALGORITHM1
6 |  end if
7 end for
```

Next algorithm 2 shows an algorithm for processing 2-qubit control gate operation in the quantum register 304. Representative example of the 2-qubit gate operation may be Controlled-NOT (CNOT or CX) and Controlled-Z(CZ).

In algorithm 2, the control qubit number, a target qubit number, and a 2×2 matrix to which the operation is to be applied are input. The 2-qubit control gate operation has unique characteristics, that is, only in case that the control qubit is in the |1> state, objective matrix operations PauliX and PauliZ are applied to the objective qubit. That is, it is not necessary to apply the matrix operation to all quantum states stored in the quantum register 304, and only in case that the control qubit state satisfies the condition of |1>. The objective matrix operation is applied.

Accordingly, like line 2 to line 3, the control qubit state is first checked before the objective matrix operation is applied to the objective qubit. If the control qubit state is |0>, it is not necessary to apply the objective matrix operation, and thus the line is branched to the start of the loop. Unlike this, if the control qubit state is |1>, like line 5, the objective matrix operation is applied to the objective qubit in accordance with the method of algorithm 1.

Referring again to FIG. 3, the quantum simulation apparatus 300 according to an embodiment of the present disclosure may include a quantum noise generator 308.

Figure 8:
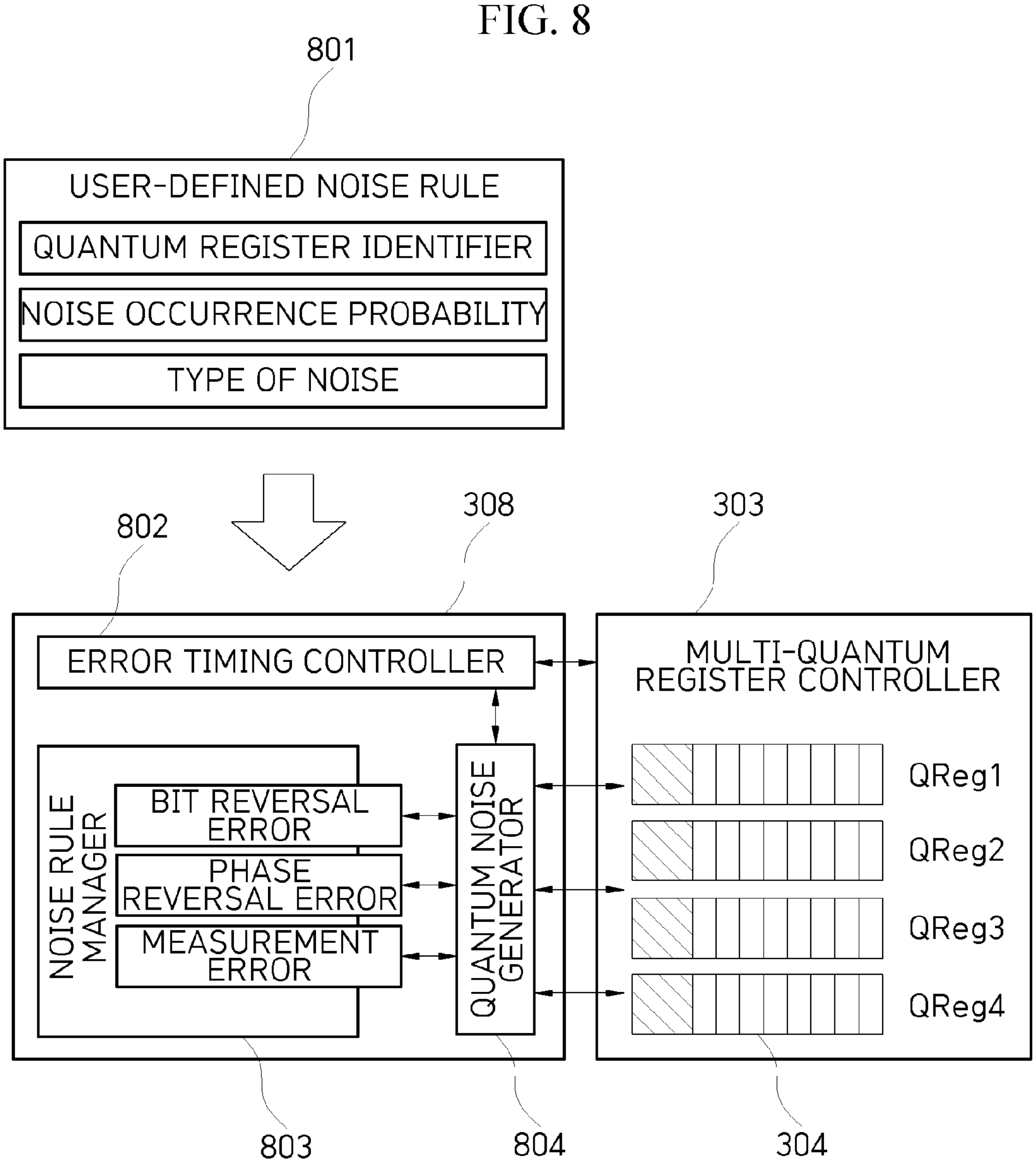
FIG. 8 is a diagram explaining a quantum noise generator in an embodiment of the present disclosure.

FIG. 8 is a diagram explaining a quantum noise generator 308 in an embodiment of the present disclosure. The quantum noise generator 308 according to an embodiment of the present disclosure includes an error timing controller 802, a noise rule manager 903, and quantum noise generator 804.

The quantum noise generator 308 is a device that generates an error in a certain qubit. The quantum computer has no choice but to inevitably include an error due to an interference phenomenon that the quantum phenomenon has. Accordingly, an embodiment of the present disclosure enables errors occurring in a real quantum computer to be reproduced even in a classic computer space through the quantum noise generator 308.

As an embodiment, the quantum noise generator 308 injects a quantum error, to which at least one of a quantum error application target quantum register defined by a user with respect to the quantum register 304, a quantum error occurrence probability, and a kind of a quantum error is applied, to the quantum register 304 through a quantum noise generator 804.

That is, in an embodiment of the present disclosure, the error occurrence rule of the quantum circuit defined by the user is used as an input instead of generating a quantum error in its own judgment of the quantum simulation apparatus 300. By doing so, various flexible quantum circuit tests including the error can be provided to the user.

Specifically, the quantum noise generator 308 makes the user designate the quantum error application target quantum resistor 304 through user-defined noise rule 1 801, and may inject the quantum error into the corresponding quantum register 304 in accordance with a designated quantum register identifier. This is for the user to directly designate a certain quantum register 304 to generate the quantum error instead of applying a common rule to all quantum registers 304. Through this, various application scenarios can be provided.

As a simple example, in case of simultaneously applying the same quantum circuit to two quantum registers, it is possible to analyze quantum phenomena as comparing simulation results with each other in a state where a quantum circuit having no quantum error is executed in one quantum register, and a quantum circuit having the quantum error is executed in another quantum register at the same time. Of course, this is merely exemplary, and other various embodiments may be configured by combining plural condition scenarios with plural quantum registers.

As another embodiment, the quantum noise generator 308 may enable the user to randomly define the noise occurrence probability that is the quantum error occurrence probability through the user-defined noise rule 2 801. In this case, the error rate in consideration of the current technology level of the physical qubits, such as a superconductor and an ion trap method, can be reflected. Meanwhile, since the quantum simulation apparatus 300 according to an embodiment of the present disclosure secures the execution through a plurality of independent quantum registers 304, different error occurrence probabilities can be defined for each individual quantum register 304.

As still another embodiment, the quantum noise generator 308 may designate and apply the kind of the quantum errors through the user-defined noise rule 3 801. That is, as clarified as 805, the quantum noise generator 308 may manage the kind of the quantum error of at least one of a bit reversal error, a phase reversal error, and a measurement error through a rule manager 803, and inject the quantum error corresponding to the kind of the at least one quantum error defined by the user.

In this case, the bit reversal error corresponds to a situation in which the quantum bits are changed each other, and means a case where the |0> and |1> states are changed each other. The phase reversal error corresponds to a situation in which the quantum phases are changed each other, and more specifically, means a case where the sign of the |1> state is reversed. Both the bit reversal error and the phase reversal error are kinds of gate operation errors. Further, the measurement error is an error that occurs in the step of measuring the quantum state, and corresponds to a technical error that occurs in the process of measuring the quantum state rather than the error by the quantum phenomenon.

Further, the quantum noise generator 308 may include an error timing controller 802 configured to control a quantum error occurrence time for injecting the quantum error into the quantum register 304 based on the quantum error occurrence rate defined by the user and the quantum circuit state through monitoring of the gate application statistics of the quantum registers 304. That is, the error timing controller 802 controls the error occurrence time in accordance with the user-defined rule. In order to control the precise error injection timing, the gate application statistics of the quantum registers 304 are always monitored, and if the user-defined error occurrence rate is satisfied, it injects the error to the necessary quantum registers 304 through the quantum noise generator 308.

Hereinafter, a method performed by the quantum simulation apparatus 300 according to an embodiment of the present disclosure will be described with reference to FIG. 9.

Figure 9:
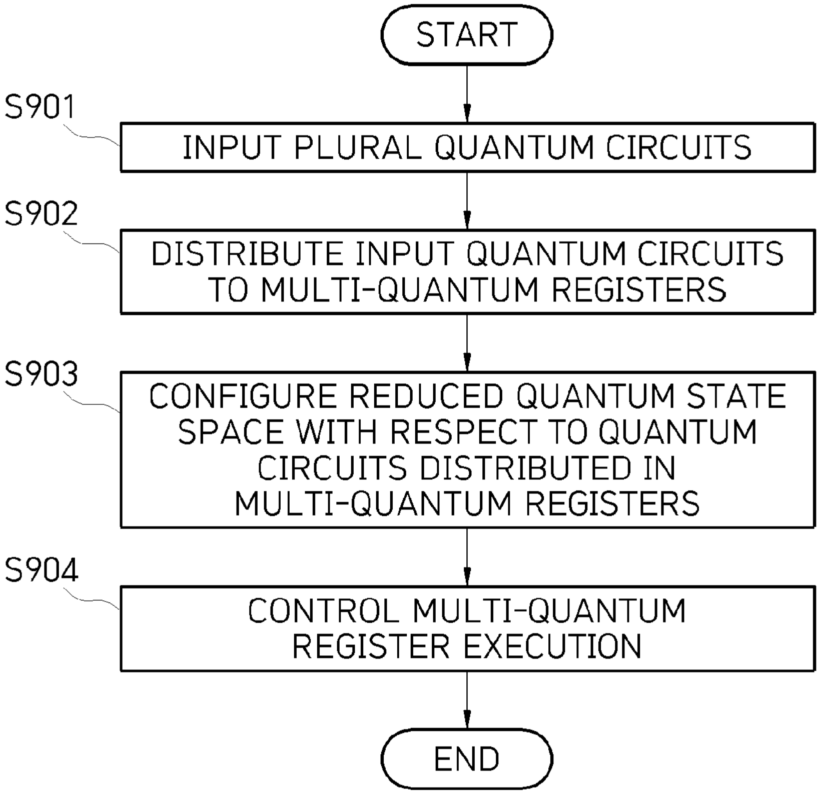
FIG. 9 is a flowchart of a quantum simulation method according to an embodiment of the present disclosure.

FIG. 9 is a flowchart of a quantum simulation method according to an embodiment of the present disclosure.

According to the quantum simulation method according to an embodiment of the present disclosure, if a plurality of quantum circuits are first input (S110), the input quantum circuits are distributed to the multi quantum registers (S120).

Next, a reduced quantum state space is configured with respect to the quantum circuits distributed in the multi-quantum registers (S130). In this case, the reduced quantum state space is configured with respect to the real quantum state having physical reality with an amplitude value that is not 0 in a wide-area quantum state space.

Next, execution of the multi quantum registers in which the reduced quantum state space is configured is controlled (S140).

Meanwhile, in the above-described description, steps S110 to S140 may be further divided into additional steps or may be combined into fewer steps depending on the implementation example of the present disclosure. Further, as needed, some steps may be omitted, or the order of the steps may be changed. In addition, even in case of other omitted contents, the contents of FIGS. 3 to 8 may be applied even to the quantum simulation method of FIG. 9.

An embodiment of the present disclosure as described above may be implemented as a program (or application) to be executed in combination with a hardware computer, and may be stored in a medium.

In order for the computer to read the above described program so as to execute the above methods, the program may include a code coded by a computer language, such as C, C++, JAVA, Ruby, and machine language, which can be read by a processor (CPU) of the computer through a device interface of the computer. Such a code may include a functional code related to a function that defines functions necessary to execute the above methods, and may include a control code related to an execution procedure necessary for the processor of the computer to execute the above functions according to a specific procedure. Further, such a code may further include additional information necessary for the processor of the computer to execute the above functions or a memory reference related code regarding at which location (address) of an internal or external memory of the computer the media is to be referred to. Further, in case that the processor of the computer is required to communicate with any other remote computer or server to execute the above functions, the code may further include a communication related code regarding how to communicate with any other remote computer or server by using a communication module of the computer, or which information or media is to be transmitted/received during the communication.

The storage medium means a medium which semi-permanently stores data and which can be read by a device, rather than a medium which stores data for a brief moment, such as a register, cache, or memory. Specific examples of the storage medium include ROM, RAM, CD-ROM, magnetic tape, floppy disc, and optical data storage device, but the present disclosure is not limited thereto. That is, the program may be stored in various recording media on various servers that can be accessed by the computer, or various recording media on a user's computer. Further, the media may be distributed in a computer system connected through a network, and may store a code that can be read by the computer in a distributed manner.

The above explanation of the present disclosure is for illustrative purposes, and it can be understood by those of ordinary skill in the art to which the present disclosure pertains that the present disclosure can be easily modified in other specific forms without changing the technical idea or essential features of the present disclosure. Accordingly, it should be understood that the above-described embodiments are illustrative in all aspects, not restrictive. For example, each constituent element explained as a single type may be distributed and carried out, and in the same manner, constituent elements explained as being distributed may be carried out in a combined form.

The scope of the present disclosure is defined by the appended claims to be described later rather than the above-described detailed description, and all changes or modifications derived from the meanings, scope, and equivalent concept of the claims should be interpreted as being included in the scope of the present disclosure.

What is claimed is:

1. A quantum simulation apparatus comprising:

a quantum circuit distributor configured to receive and transfer a plurality of quantum circuits; and a multi-quantum register controller configured to control independent allocation and execution of the plurality of quantum circuits into multi-quantum registers supporting a reduced quantum state space, the multi-quantum register controller being further configured to apply a matrix operation in accordance with performing a quantum gate operation in the reduced quantum state space in case that an amplitude of at least one quantum state vector constituting a quantum state pair is not 0, wherein each of the multi-quantum registers includes a plurality of index containers for parallel processing of quantum state tracking and quantum operations, wherein real quantum states are stored in an order of quantum indexes in the plurality of index containers, wherein each index container includes a metadata area for managing a number of quantum states included in an index container area and lock information supporting parallel processing of the quantum operations, and a data area for storing attribute information including quantum indexes and amplitude values of the real quantum states, wherein the multi-quantum registers provide the reduced quantum state space with respect to a real quantum state having a physical reality with an amplitude value that is not 0 in a wide-area quantum state space, and wherein each multi-quantum register maintains, for each real quantum state configuring the reduced quantum state space, a quantum index representing a position in a 2^N wide-area quantum state space composed of N qubits to preserve a logical position of the real quantum state in the wide-area quantum state space.

2. The quantum simulation apparatus of claim 1, wherein as the quantum circuits are allocated, the multi-quantum registers are configured to manage the reduced quantum state space composed of independent qubits, but not to allow information exchange among the respective quantum registers.

3. The quantum simulation apparatus of claim 1, further comprising a quantum circuit analyzer configured to predict an execution complexity for the input quantum circuits, wherein the quantum circuit distributor is configured to transfer the quantum circuits and the predicted execution complexity of the quantum circuits to the multi-quantum register controller.

4. The quantum simulation apparatus of claim 3, wherein the quantum circuit analyzer is configured to predict the execution complexity by applying specific weight values to the number of qubits of the quantum circuits, the number of gate operations applied to the quantum circuits, and depth information of the quantum circuit.

5. The quantum simulation apparatus of claim 3, further comprising an operation resource distributor configured to distribute computing resources for the multi-quantum registers based on the predicted execution complexity, wherein the operation resource distributor is configured to distribute the computing resources to the corresponding quantum registers in accordance with a ratio of the execution complexity of the individual quantum circuit to the total execution complexity of the plurality of quantum circuits with respect to the entire computing resources.

6. The quantum simulation apparatus of claim 1, further comprising a quantum operator configured to provide at least one of a 1-qubit gate operation rule and a 2-qubit gate operation rule to the quantum register.

7. The quantum simulation apparatus of claim 6, wherein in case that the 1-qubit gate operation rule is applied to the quantum operator, the multi-quantum register controller is configured to: calculate an amplitude value of the quantum state pairs corresponding to a quantum state given to the multi-quantum state register, calculate a new amplitude value by applying the matrix operation for the amplitude value of the quantum state pair, and then update the quantum register with the amplitude value calculated as the result of the matrix operation.

8. The quantum simulation apparatus of claim 7, wherein the multi-quantum register controller is configured to calculate the amplitude value of the quantum state pairs by using a stored amplitude if the quantum state pair exists in the quantum register and by initializing the amplitude value to 0 if the quantum state pair does not exist in the quantum register.

9. The quantum simulation apparatus of claim 7, wherein in case that the amplitude value to be updated is 0, the multi-quantum register controller is configured to remove the quantum state from the quantum register if the quantum state corresponding to the quantum state pair exists in the quantum register.

10. The quantum simulation apparatus of claim 7, wherein in case that the amplitude value to be updated is not 0, the multi-quantum register controller is configured to: update the amplitude value of the quantum state with the amplitude value to be updated if the quantum state corresponding to the quantum state pair exists in the quantum register, and allocate a new quantum state as a data storage item and add the new quantum state to the quantum register if the quantum state corresponding to the quantum state pair does not exist.

11. The quantum simulation apparatus of claim 6, wherein in case that the 2-qubit gate operation rule is applied in the quantum operator, the multi-quantum register controller is configured to:

sequentially traverse the real quantum states stored in the quantum register, and select only a case where the quantum state of a control qubit is a |1> state as an objective matrix operation application target, and apply an objective matrix operation to the quantum state pairs corresponding to the objective qubit.

12. The quantum simulation apparatus of claim 1, further comprising a quantum noise generator configured to inject a quantum error to which at least one of a quantum error application target quantum register defined by a user with respect to the quantum register, a quantum error occurrence probability, and a kind of a quantum error is applied.

13. The quantum simulation apparatus of claim 12, wherein the quantum noise generator comprises a rule manager configured to manage the kind of the quantum error of at least one of a bit reversal error, a phase reversal error, and a measurement error, and is configured to inject the quantum error corresponding to the kind of the at least one quantum error defined by the user.

14. The quantum simulation apparatus of claim 12, wherein the quantum noise generator comprises an error timing controller configured to control a time of the quantum error occurrence for injecting the quantum error into the quantum register based on a quantum error occurrence rate defined by the user and the quantum circuit state through monitoring of gate application statistics of the quantum register.

15. A method performed by a quantum simulation apparatus comprising:

receiving a plurality of quantum circuits;

distributing the plurality of quantum circuits in multi-quantum registers;

configuring a reduced quantum state space with respect to the quantum circuits distributed in the multi-quantum registers;

maintaining, for each of the multi-quantum registers, a plurality of index containers for parallel processing of quantum state tracking and quantum operations;

storing real quantum states in an order of quantum indexes in the plurality of index containers;

managing, within each index container, a metadata area for managing a number of quantum states included in an index container area and lock information supporting parallel processing of the quantum operations, and a data area for storing attribute information including quantum indexes and amplitude values of the real quantum states; and controlling execution of the multi-quantum registers in which the reduced quantum state space is configured and applying a matrix operation in accordance with performing a quantum gate operation in the reduced quantum state space in case that an amplitude of at least one quantum state vector constituting a quantum state pair is not 0, wherein the configuring of the reduced quantum state space with respect to the quantum circuits distributed in the multi-quantum registers includes configuring the reduced quantum state space with respect to a real quantum state having a physical reality with an amplitude value that is not 0 in a wide-area quantum state space, and wherein each multi-quantum register maintains, for each real quantum state configuring the reduced quantum state space, a quantum index representing a position in a 2^N wide-area quantum state space composed of N qubits to preserve a logical position of the real quantum state in the wide-area quantum state space.

* * * * *